(12) United States Patent
Hayashimoto et al.

(10) Patent No.: US 6,870,582 B2
(45) Date of Patent: Mar. 22, 2005

(54) LIQUID CRYSTAL DISPLAY DEVICE HAVING HOOKS FOR ASSEMBLING MEMBERS THEREOF

(75) Inventors: Seiji Hayashimoto, Kawasaki (JP); Takayuki Eiraku, Kawasaki (JP)

(73) Assignee: Fujitsu Display Technologies Corporation, Kawasaki (JP)

( * ) Notice: Subject to any disclaimer, the term of this patent is extended or adjusted under 35 U.S.C. 154(b) by 13 days.

(21) Appl. No.: 10/144,671

(22) Filed: May 13, 2002

(65) Prior Publication Data

US 2003/0122992 A1 Jul. 3, 2003

(30) Foreign Application Priority Data

Dec. 27, 2001 (JP) .......................................... 2001-397437

(51) Int. Cl.[7] .......................................... G02F 1/1333
(52) U.S. Cl. .......................................................... 349/58
(58) Field of Search .......................................... 349/58

(56) References Cited

U.S. PATENT DOCUMENTS

| | | | | |
|---|---|---|---|---|
| 5,335,100 A | * | 8/1994 | Obata ........................... | 349/65 |
| 5,375,005 A | * | 12/1994 | Komano ........................ | 349/58 |
| 5,570,267 A | * | 10/1996 | Ma ................................ | 361/681 |
| 5,680,183 A | * | 10/1997 | Sasuga et al. ................. | 349/58 |
| 5,889,572 A | * | 3/1999 | Takahashi et al. ............ | 349/149 |
| 5,994,769 A | * | 11/1999 | Onoda et al. .................. | 257/679 |
| 6,373,537 B2 | * | 4/2002 | Yun et al. ...................... | 349/58 |
| 6,559,907 B1 | * | 5/2003 | Byoun ........................... | 349/58 |
| 6,593,979 B1 | * | 7/2003 | Ha et al. ........................ | 349/58 |
| 2001/0035923 A1 | * | 11/2001 | Cha et al. ...................... | 349/65 |
| 2002/0080299 A1 | * | 6/2002 | Yun et al. ...................... | 349/58 |

FOREIGN PATENT DOCUMENTS

| | | |
|---|---|---|
| JP | 10-123514 | 5/1998 |
| JP | 2001-33764 | 2/2001 |
| JP | 2001-356323 | 12/2001 |

* cited by examiner

Primary Examiner—Tarifur R. Chowdhury
(74) Attorney, Agent, or Firm—Greer, Burns & Crain, Ltd.

(57) ABSTRACT

A liquid crystal display device includes first and second frame members, between which a light source device, a metal body supporting the light source device, a frame-like cover covering the peripheral region of the light source device, and a liquid crystal display element are held by the cover. The first frame member covers the peripheral region of the liquid crystal display element and has hooks for engagement with the recess in metal body. Therefore, the metal body, the light source device, the cover, the liquid crystal display element, and the first frame member are assembled and fastened together by the engagement of the hooks with the metal body. This assembly can be coupled to the second frame member. Straight metal members can be arranged between the first frame member and the driving ICs on the liquid crystal display element.

8 Claims, 8 Drawing Sheets

LIQUID CRYSTAL DISPLAY DEVICE HAVING HOOKS FOR ASSEMBLING MEMBERS THEREOF

BACKGROUND OF THE INVENTION

1. Field of the Invention

The present invention relates to a liquid crystal display device having a backlight.

2. Description of the Related Art

A liquid crystal display device comprises a liquid crystal display panel (liquid crystal display element) having a pair of glass substrates and a liquid crystal held therebetween, and a light source device (backlight) provided behind the liquid crystal display element. In a TN-type liquid crystal display device, a pair of polarizers are provided on opposite sides of the liquid crystal display element. In the case where the liquid crystal display device is used as a monitor, a metal body supports the backlight, and a frame-like cover covers the peripheral region of the backlight. The liquid crystal display element is held by the cover, and a frame member is provided to cover the peripheral region of the liquid crystal display element. An annular or frame-like metal member is arranged between the frame member and driving ICs provided on the outer peripheral region of the liquid crystal display element.

FIGS. 11 through 13B show an example of a conventional liquid crystal display device. FIG. 11 shows an exploded perspective view of a conventional liquid crystal display module. FIGS. 12A and 12B are perspective views of the liquid crystal display module shown in FIG. 11. FIGS. 13A and 13B are exploded perspective views of the liquid crystal display device including the liquid crystal display module shown in FIGS. 12A and 12B.

In FIG. 11, the liquid crystal display module 50 comprises a backlight 52, a metal body 54 supporting the backlight 52, a frame-like cover 56 covering the peripheral region of the backlight 52, a liquid crystal display element 58 held by the cover 56, and a frame-like metal member 60. The backlight 52 comprises a light guide plate 62, lamps 64 provided on opposite sides of the light guide plate 62, and a reflection film 66 provided beneath the light guide plate 62. Moreover, scattering sheets (or diffusion sheets) 68 and 70 are optionally provided between the light guide plate 62 and the liquid crystal display element 58.

FIG. 12A shows an assembly of the liquid crystal display module 50 shown in FIG. 11. FIG. 12B shows an inverted state of the liquid crystal display module 50 shown in FIG. 12A. The metal body 54 and the metal member 60 are connected together by screws 72 to complete the assembly of the liquid crystal display module 50.

FIG. 13A shows an assembly 78 comprising the liquid crystal display module 50, a first frame member 74 covering the peripheral region of the liquid crystal display module 50, and a metal plate 76 provided underneath the liquid crystal display module 50. The liquid crystal display module 50 and the metal plate 76 are connected by screws 80. FIG. 13B shows a liquid crystal display device 86 comprising the assembly 78, a second frame member 82 and a leg device 84. In FIG. 13B, the assembly 78 shown in FIG. 13A is turned upside down and the liquid crystal display device is assembled in this state. The second frame member 82 and the assembly 78 are connected together by screws 88. The leg device 84 is fastened to the second frame member 82 by screws (not shown) to support the liquid crystal display device 86.

In the conventional liquid crystal display device 86, the metal body 54 supporting the backlight 52 and the metal plate 76 mounted on the liquid crystal display module 50 are used. Therefore, a plurality of screw fastening operations are necessary to assemble the liquid crystal display device 86, and this results in an increase in the number of the assembling steps and an increase in the cost of the materials.

SUMMARY OF THE INVENTION

It is an object of the present invention to provide a liquid crystal display device which can be easily assembled and in which the cost of materials can be reduced.

According to the present invention, there is provided a liquid crystal display device comprising a light source device, a metal body supporting the light source device, a frame-like cover covering the peripheral region of the light source device, a liquid crystal display element held by the cover, and a frame member covering the peripheral region of the liquid crystal display element, the frame member having hooks for engagement with the metal body.

With this structure, the liquid crystal display device can be easily assembled by engaging the hooks provided on the frame member with the metal body supporting the light source device.

Preferably, at least one metal member which is not in the form of a frame is arranged between the frame member and a driving member provided on the outer peripheral region of the liquid crystal display element. In this case, the cost of the metal material can be reduced.

The metal member can be electrically connected to the metal body by a fastening member for assembling the liquid crystal display device.

In an embodiment, an assembly including the light source device, the metal body, the cover, the liquid crystal display element, the metal member, and the frame member is connected to a second frame member by screws, the at least one metal member being electrically connected to the metal body by a screw coupling the assembly to the second frame member.

It is preferable that the metal member comprises at least one metal piece which extends along at least one side of the liquid crystal display element.

BRIEF DESCRIPTION OF THE DRAWINGS

The invention will be discussed below with reference to the drawings, in which.

DESCRIPTION OF THE PREFERRED EMBODIMENTS

Figure 1:
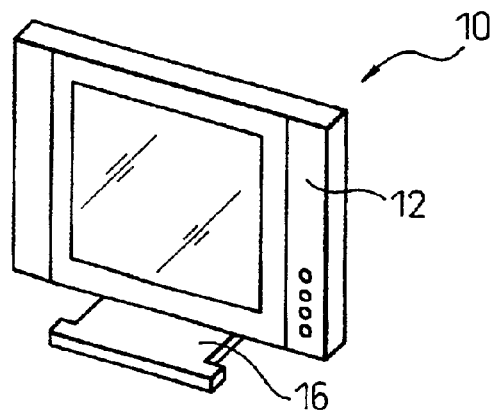
FIG. 1 is a perspective view of a liquid crystal display device according to an embodiment of the present invention.
Figure 2:
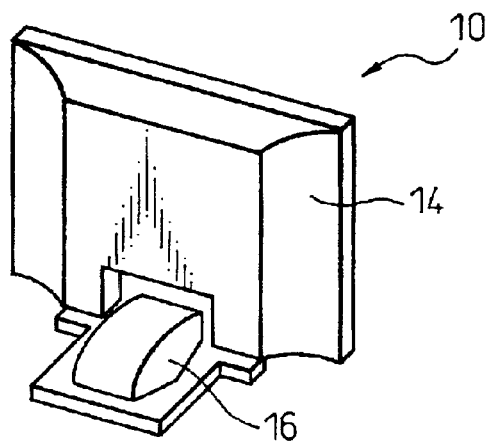
FIG. 2 is a perspective rear view of the liquid crystal display device shown in FIG. 1.
Figure 3:
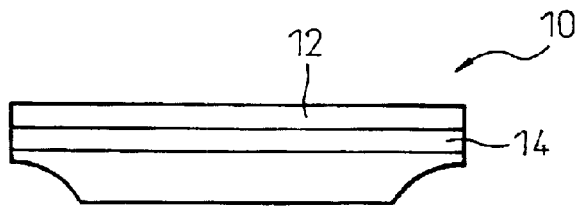
FIG. 3 is a top view of the liquid crystal display device shown in FIGS. 1 and 2.

FIG. 1 shows a perspective view of a liquid crystal display device 10 according to an embodiment of the present invention. FIG. 2 shows a perspective rear view of the liquid crystal display device 10 shown in FIG. 1. FIG. 3 is a top view of the liquid crystal display device 10 shown in FIGS. 1 and 2.

In FIGS. 1 through 3, the liquid crystal display device 10 comprises a first frame member 12, a second frame member 14, and a leg device 16. The first frame member 12 and the second frame member 14 are coupled to each other to form a frame body of the liquid crystal display device 10. The first and second frame members 12 and 14 are made of plastic.

Figure 4:
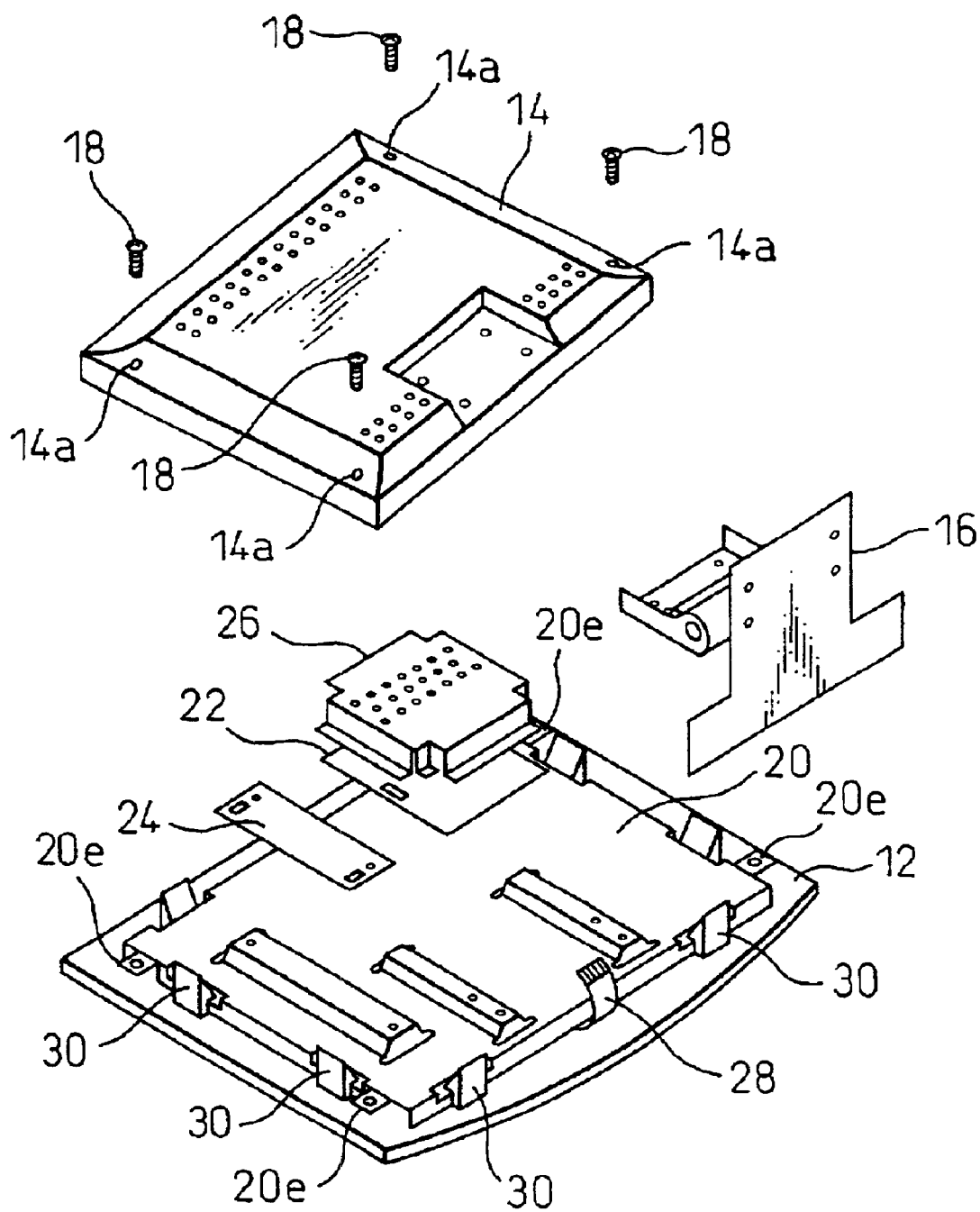
FIG. 4 is an exploded perspective view of the liquid crystal display device shown in FIGS. 1 through 3.

FIG. 4 is an exploded perspective view of the liquid crystal display device 10 shown in FIGS. 1 through 3. The second frame member 14 is connected to the first frame member 12 by means of screws 18. The leg device 16 is connected to the second frame member 14 by means of screws (not shown). A metal body or case 20 is mounted to the first frame member 12. The metal body 20 supports a backlight and a liquid crystal display panel, which will be discussed later. A printed circuit board 22, an inverter 24 and other electric circuits/electronic elements are mounted on the metal body 20. Numeral 26 designates a shield cover and numeral 28 designates a flexible tape. Numeral 30 connotes hooks, each in the form of a claw, which will be discussed later.

Figure 5:
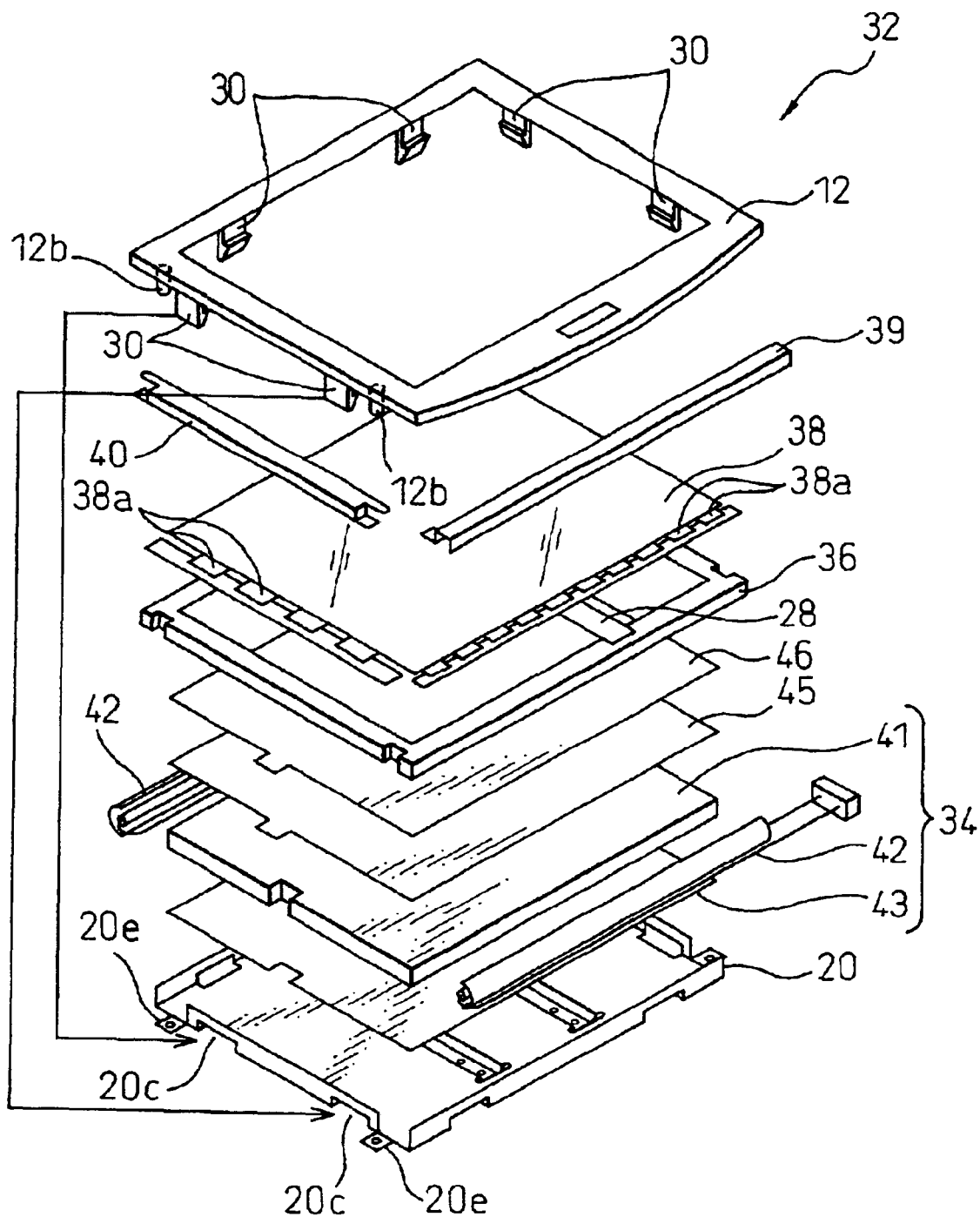
FIG. 5 is an exploded perspective view of the assembly including the first frame member and the metal body.

FIG. 5 shows an exploded perspective view of an assembly 32 including the first frame member 12 and the metal body 20, and members provided therebetween. The assembly 32 comprises a backlight (light source device) 34, the metal body 20 supporting the backlight 34, a frame-like cover 36, covering the peripheral region of the backlight 34, a liquid crystal display element 38 held by the cover 36, metal members 39 and 40, which are not in the form of a frame (but linearly extend in the illustrated embodiment), and the first frame member 12. The first frame member 12 has a central opening defining a display area of the liquid crystal display device.

The liquid crystal display element 38 comprises a pair of glass substrates and a liquid crystal held therebetween and includes a pair of polarizers. Driving ICs 38a are provided on the outer peripheral region of the liquid crystal display element 38 to drive the liquid crystal. The driving ICs 38a are connected to the printed circuit. The flexible tape 28 is connected to the printed circuit connected to the driving ICs 38a. The (linear) metal members 39 and 40, which are not in the form of a frame, extend along the two sides of the liquid crystal display element 38 and cover the driving ICs 38 to protect the driving ICs 38a from static electricity.

The backlight 34 comprises a light guide plate 41, fluorescent lamps 42 provided on opposite sides of the light guide plate 41, and a reflection film 43 provided underneath the light guide plate 41. Scattering sheets (or the diffusion sheets) 45 and 46 are optionally provided between the light guide plate 41 and the liquid crystal display element 38.

Figure 6:
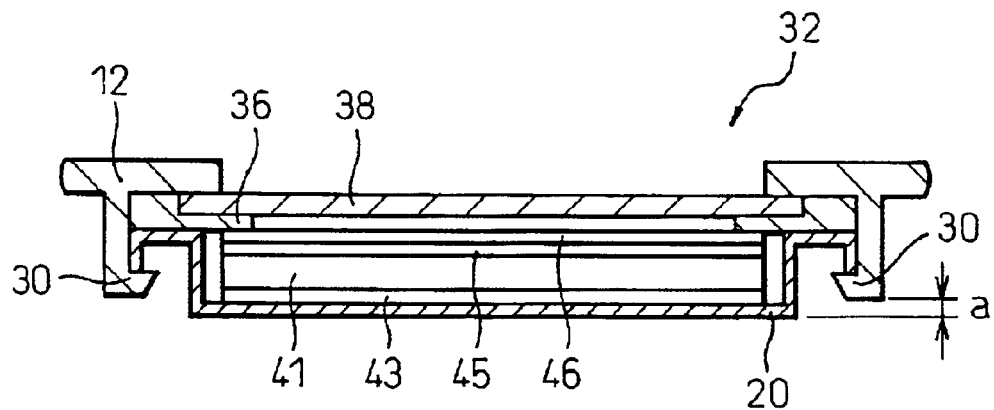
FIG. 6 is a cross-sectional view of the assembly shown in FIG. 5.

FIG. 6 shows a cross-sectional view of the assembly 32 shown in FIG. 5. In FIGS. 5 and 6, the first frame member 12 is provided on its outer peripheral portion with hooks 30 in the form of claws. The hooks 30 are engageable with the metal body 20.

Figure 7:
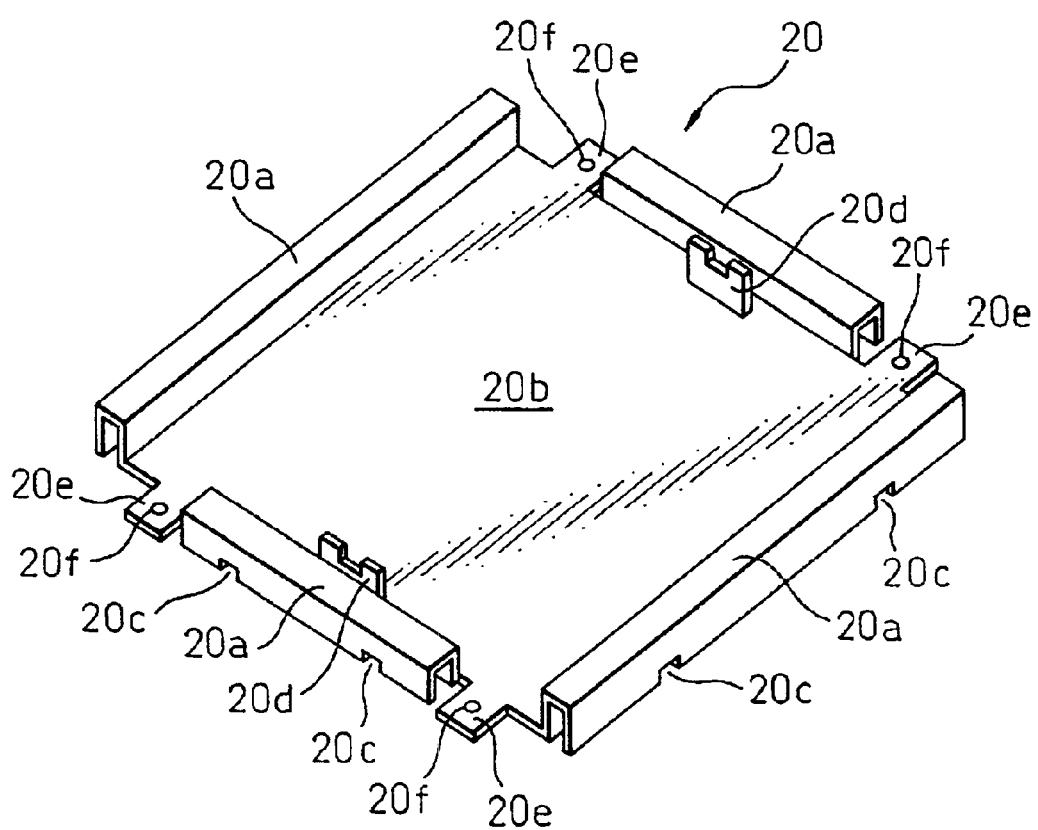
FIG. 7 is a perspective view of the metal body shown in FIGS. 5 and 6.

FIG. 7 shows a perspective view of the metal body 20 shown in FIGS. 5 and 6. The metal body 20 comprises a metal plate (e.g., an aluminum plate) which is bent and has four vertical peripheral walls 20a and a bottom wall 20b surrounded by the four vertical peripheral walls 20a. As can be seen in FIGS. 5 through 7, the backlight 34 and the scattering sheets (or diffusion sheets) 45 and 46 are arranged in an accommodation space defined by the four vertical peripheral walls 20a and the bottom wall 20b. The frame-like cover 36 covers the peripheral regions of the backlight 34 and the scattering sheets (or diffusion sheets) 45 and 46. Also, the frame-like cover 36 can hold the liquid crystal display element 38.

The metal body 20 has engagement recesses 20c formed in the bottom portions of the vertical peripheral walls 20a, so that the hooks 30 of the first frame member 12 can engage in the engagement recesses 20c. Each vertical peripheral wall 20a has two engagement recesses 20c. The metal body 20 has positioning pieces 20d having grooves and projections on the inner sides of the vertical peripheral walls 20a. Grooves or projections provided at the ends of the backlight 34 and the scattering sheets (or diffusion sheets) 45 and 46, shown in FIG. 5, are engaged with the projections and grooves of the positioning pieces 20, respectively, to position these members in a predetermined position in the metal body 20.

The metal body 20 has screw engagement pieces 20e. As can be seen in FIG. 4, the second frame member 14 is coupled to the first frame member 12 by the screws 18. The screws 18 pass through holes 14a of the second frame member 14 and holes 20f of the screw-engagement pieces 20e of the metal body 20 and are screwed in threaded holes of the bosses 12b (FIG. 5) provided on the first frame member 12.

Figure 8:
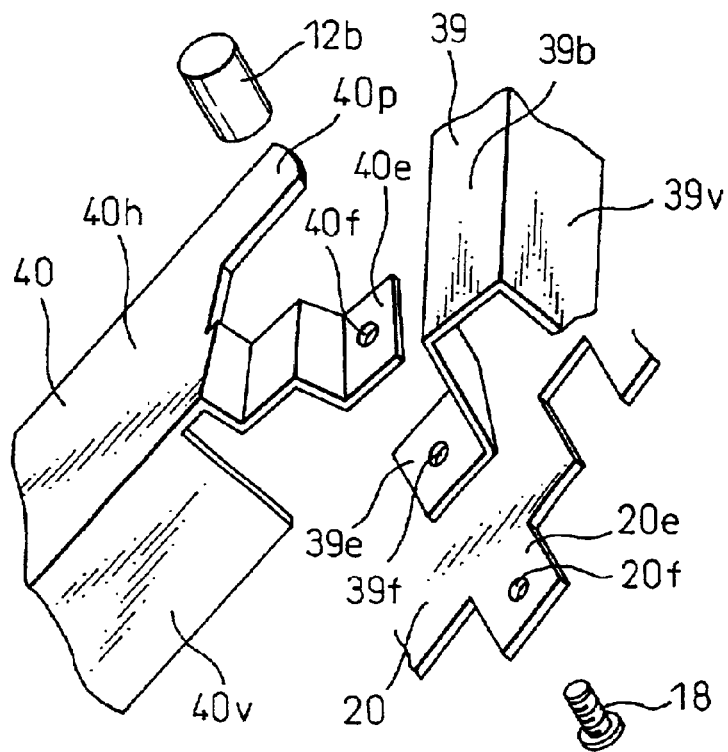
FIG. 8 is a perspective view of the metal members which are not in the form of a frame and are arranged between the first frame member and the driving IC provided on the peripheral region of the liquid crystal display element, shown in FIG. 1.

FIG. 8 shows a perspective view of the metal members 39 and 40 which are not in the form of a frame and which are arranged between the first frame member 12 shown in FIG. 5 and the driving ICs 38a provided on the outer peripheral regions of the liquid crystal display element 38. The metal members 39 and 40 have an L-shape in cross-section, and have horizontal portions 39h and 40h and vertical portions 39v and 40v, respectively. An engagement piece 39e is formed on the metal member 39. The engagement piece 39e extends downward from the horizontal portion 39h and is bent in the horizontal direction. Likewise, an engagement piece 40e is formed on the metal member 40. The engagement piece 40e extends stepwise in the downward direction from the horizontal portion 40h and are bent in the horizontal direction. The engagement pieces 39e and 40e are arranged to overlap one of the screw-engagement pieces 20e of the metal body 20 along a vertical line.

The screw 18 passes through the hole 20f of the screw engagement piece 20e of the metal body 20, through a hole 20*f* of the screw-engagement piece 20*e* of the metal body 20 and the holes 39*f* and 40*f* of the engagement pieces 39*e* and 40*e* of the metal members 39 and 40, and is screwed in the threaded hole in the bosse 12*b* of the first frame member 12. Therefore, the metal members 39 and 40 are electrically connected to the metal body 20 by the screw 18 which is used to secure the assembly 32 to the second frame member 14. That is, the metal members 39 and 40 are electrically connected to the metal body 20 by a screw for assembling the liquid crystal display device 10. Namely, the metal members 39 and 40 can be connected to the ground.

Further, an extension 40*p* of the horizontal portion 40*h* of one metal member 40 extends toward the other metal member 39, so that a gap provided between the metal members 39 and 40 becomes as small as possible. The extension 40*p* covers a portion of the printed circuit located in the vicinity of the corner between the two adjacent sides of the liquid crystal display element 38.

The assembly 32 including the metal body 20, the backlight 34, the cover 36, the liquid crystal display element 38, the metal members 39 and 40 which are not in the form a frame, and the first frame member 12 can be easily assembled together by engaging the hooks 30 of the first frame member 12 with the engagement recesses 20*c* in the metal body 20. The number of the screw fastening steps can be reduced. In FIG. 6, the lower end of the hook 30 is located between the bottom surface of the metal body 20 and the first frame member 12, and at a distance "a" from the bottom surface of the metal body 20 toward the display surface side. Therefore, the thickness of the unit (such as monitor) can be reduced.

Figure 9A:
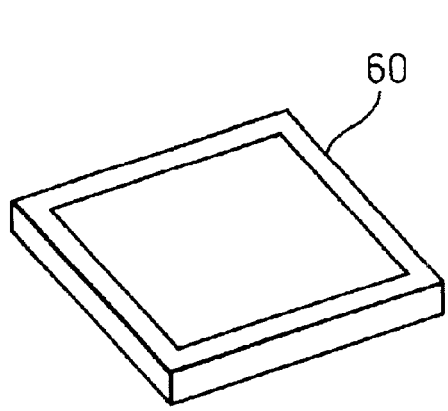
FIG. 9A is a schematic view of a metal member in the form of a frame, shown in FIG. 11.
Figure 9B:
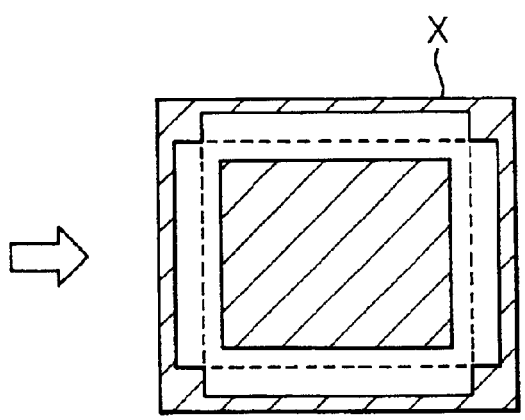
FIG. 9B is a schematic view of a sheet material of which the metal member of FIG. 9A is made.
Figure 11:
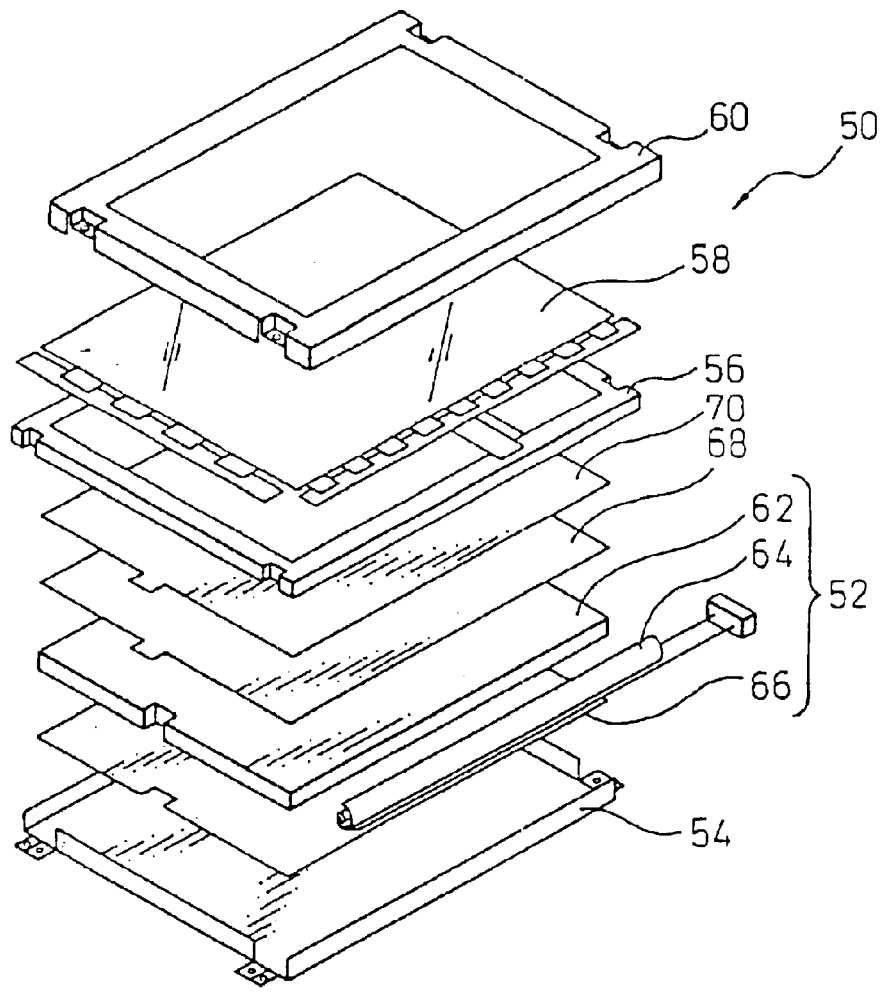
FIG. 11 is an exploded perspective view of a conventional liquid crystal display module.
Figure 12A:
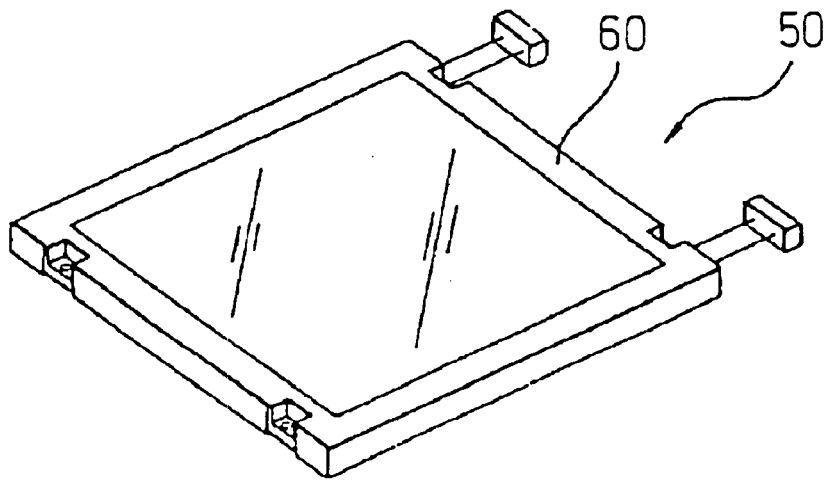
FIGS. 12A and 12B are perspective views of the liquid crystal display module shown in FIG. 11.
Figure 12B:
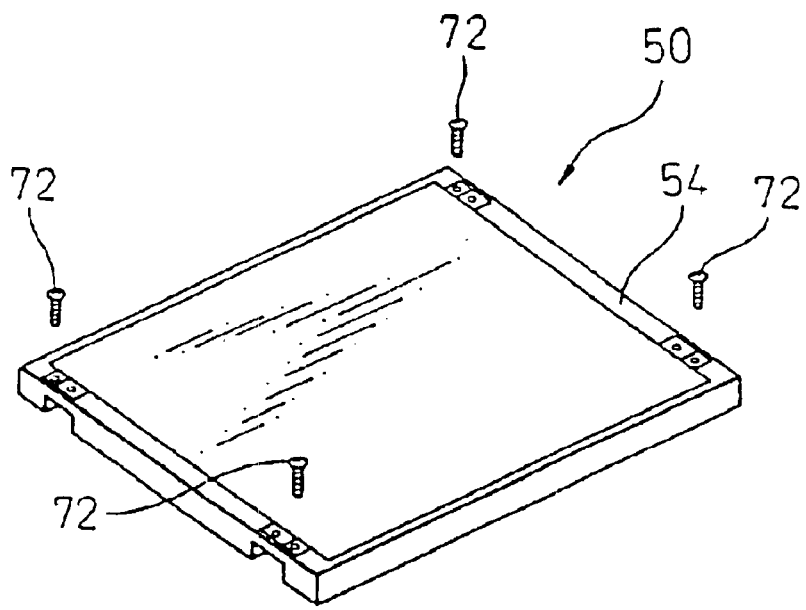
Figure 13B:
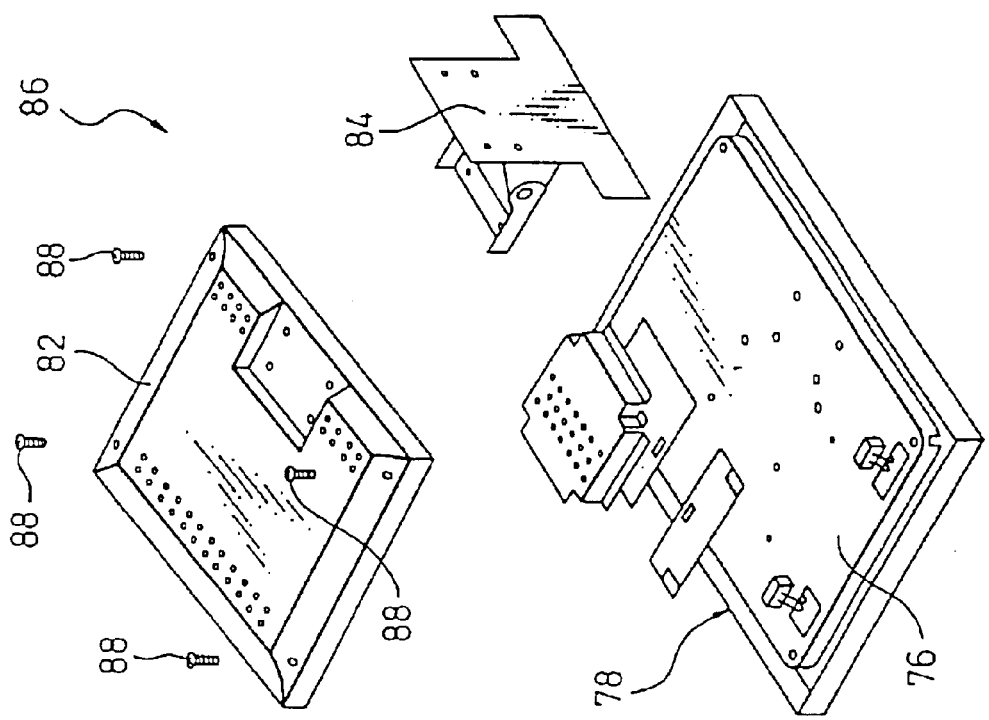
FIGS. 13A and 13B are exploded perspective views of the liquid crystal display device including the liquid crystal display module shown in FIGS. 12A and 12B.
Figure 13A:
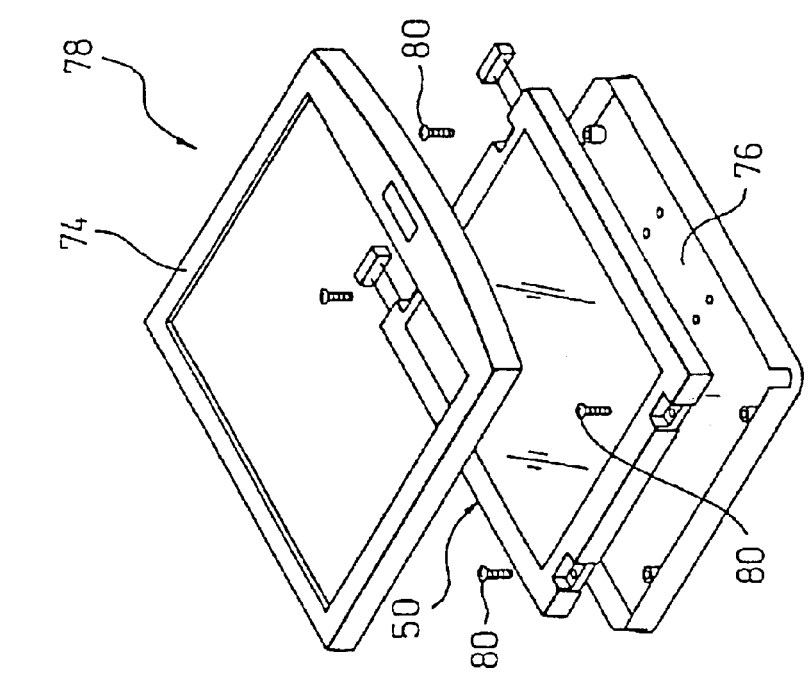

FIGS. 9A and 9B show the frame-like metal member 60 shown in FIG. 11 and a sheet material of which the metal member 60 is made. FIG. 9A shows the frame-like metal member 60 and FIG. 9B shows the sheet material X of which the frame-like metal member 60 is made. The frame-like metal member 60 is formed by punching a non-hatched portion from the metal sheet X and bending the same along the dotted line. The remaining portion (hatched portion) of the sheet material X is removed.

Figure 10A:
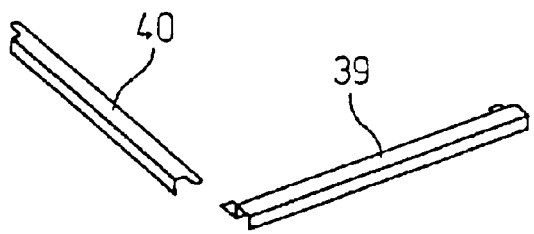
FIG. 10A is a schematic view of metal members which are not in the form of a frame, according to the present invention.
Figure 10B:
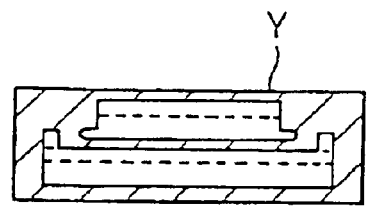
FIG. 10B is a schematic view of a sheet material of which the metal members of FIG. 10A are made.

FIGS. 10A and 10B show the metal members 39 and 40 which are not in the form of a frame, according to the present invention, and a sheet material Y of which the metal members 39 and 40 are made. FIG. 10A shows the metal members 49 and 40 which are not in the form of a frame and FIG. 10B shows the sheet material (e.g., aluminum sheet) Y of which the metal members 39 and 40 are made. The metal members 39 and 40 which are not in the form of a frame are formed by punching non-hatched portions from the metal sheet Y and bending the same along the dotted line. The upper non-hatched portion of the sheet material Y forms the short metal member 40 and the lower non-hatched portion larger than the upper non-hatched portion forms the long metal member 39. The remaining portion (hatched portion) of the sheet material Y is removed. The metal members 39 and 40 which are not in the form of a frame make it possible to reduce the amount of the metal necessary to make the metal members and reduce the amount of material to be removed.

As will be understood from the above discussion, according to the present invention, a liquid crystal display device which can be easily assembled and in which the cost of material can be reduced can be obtained.

What is claimed is:

1. A liquid crystal display device comprising:

a frame body including a front frame member and a rear frame member coupled together;

a light source device;

a metal body supporting the light source device;

a frame-like cover covering the peripheral region of the surface of the light source device;

a liquid crystal display element held by the cover;

a driving member arranged on the peripheral region of the liquid crystal display element; and at least one metal member arranged between said front frame member and the driving member for protecting said driving member from static electricity;

wherein said front frame member covers the peripheral region of the surface of the liquid crystal display element, said front frame member has hooks for engagement with the metal body so that said front frame member, the metal member, the driving member, the liquid crystal display element, the cover, the light source device, and the metal body form an assembly as a unit, and said assembly is coupled to said rear frame member by screws.

2. The liquid crystal display device according to claim 1, wherein said at least one metal member is not in the form of a frame.

3. The liquid crystal display device according to claim 2, wherein said at least one metal member is electrically connected to the metal body by said screws.

4. The liquid crystal display device according to claim 3, wherein said metal body has, along one side thereof, a hook engagement recess for engagement with said hook and a screw engagement piece with a hole for receiving said screw.

5. The liquid crystal display device according to claim 2, wherein the metal member comprises at least one metal piece which extends along at least one side of the liquid crystal display element.

6. The liquid crystal display device according to claim 1, wherein said hook has an end located between a bottom surface of said metal body and said frame member.

7. The liquid crystal display device according to claim 1, wherein said front and rear frame members are made of plastics.

8. The liquid crystal display device according to claim 1, wherein said hooks are provided on the bottom of said front frame member at positions inwardly shifted from an outer peripheral edge of said one frame member.

* * * * *